Patented Apr. 12, 1949 2,467,245

UNITED STATES PATENT OFFICE 2,467,245

POLYMERIZATION OF ETHYLENE

Gerald M. Whitman, Claymont, and Samuel L. Scott, Wilmington, Del., assignors to E. I. du Pont de Nemours & Company, Wilmington, Del., a corporation of Delaware No Drawing. Application February 5, 1946, Serial No. 645,656

3 Claims. (Cl. 260—94.9)

This invention relates to polymerization processes and products, and more specifically to a process for the polymerization of ethylene in the presence of a metal of group II of the Periodic Table and to the products obtained thereby.

The polymerization of ethylene is not new. It has been accomplished by heat, pressure, ultraviolet light, silent electric discharge, cathode rays, and by a large number of catalysts, as well as by combinations of these. In general, the first five methods tend to produce liquid to oily materials of relatively low molecular weight, while the use of catalysts yields products which vary from liquids to hard, tough plastics. A wide range of substances has been employed as catalysts, including molecular oxygen, peroxy-type compounds and other free radical-producing materials, acids, acid salts, Friedel-Crafts catalysts, and various metals and their oxides and salts.

An object of the present invention is to provide improved catalysts for the polymerization of ethylene. A further object of the invention is to provide a process for the polymerization of ethylene under elevated temperatures and super-atmospheric pressures wherein the reaction is catalyzed by a metal of group II of the periodic table. Yet another object of the invention is to provide a process for the polymerization of ethylene, to normally solid products, at elevated temperatures and pressures in the presence of a metal of group II in the periodic table and under anhydrous conditions. Other objects and advantages of the invention will hereinafter appear.

This invention comprises a process for polymerizing ethylene in the presence of a metal of group II of the periodic table to yield polymeric products, and the products obtained thereby.

The following general procedure illustrates one manner of practicing this invention. The reaction may, however, be operated batch-wise, semi-continuously, or continuously.

A vessel capable of withstanding high pressure is charged with the catalyst. An inert reaction medium may be added, if desired. The reactor is then closed and evacuated to remove as much air as possible. The reaction vessel, which is capable of being heated, is placed in a shaker mechanism, connected to a source of high-pressure ethylene, and fitted with recording and controlling thermocouples. The valve of the vessel is opened, ethylene is admitted to the pressure desired, and heating and agitation are started. Reaction, which starts upon reaching the reaction temperature, may be followed by the pressure drop due to the utilization of the ethylene. The pressure is maintained throughout the reaction by the occasional admission of more ethylene. When the reaction is complete, as evidenced by lack of further pressure drop, the vessel is cooled, bled of excess ethylene, opened, and the contents discharged. The product is freed of catalyst by mechanical separation or by dissolution in a suitable solvent, followed by filtration and removal of the solvent.

The examples which follow are carried in a 400 cc. reactor and illustrate but do not limit the invention. Parts are by weight unless otherwise stated.

*Example 1.*—A stainless steel pressure reactor is flushed with dry oxygen-free nitrogen and charged with 5 parts of metallic calcium. The vessel is closed, evacuated, and pressured to 75 atmospheres with ethylene. The vessel is again closed, placed in a shaker machine, and the necessary connections to thermocouples and recording devices made. During a reaction time of 8.25 hours, throughout which the temperature is maintained at 248°–252° C. and the pressure at 825–980 atmospheres, the total observed pressure drop is 845 atmospheres. The vessel is cooled, bled of excess ethylene, opened, and the reaction mixture discharged. The product consists of 90.2 parts of a spongy white solid, M. P. 90°–92° C. (bloc Maquenne). It has an intrinsic viscosity of 0.43 (0.125% solution in xylene at 85° C.).

*Example 2.*—A stainless steel-lined reaction vessel is flushed with nitrogen and charged with 5 parts of barium metal. The reactor is then closed, evacuated, pressured to 60 atmospheres with ethylene, and the reaction conducted as described in Example 1. During a reaction time of 8.5 hours at 250°–254° C. and 850–950 atmospheres, throughout which time the pressure is maintained in the indicated range by periodically repressuring with ethylene, there is an observed pressure drop of 560 atmospheres. The product amounts to 55.5 parts of polyethylene, melting at 90° C. (bloc Maquenne). It has an intrinsic viscosity of 0.53 (0.125% solution in xylene at 85° C.).

*Example 3.*—A stainless steel-lined pressure reactor is flushed with nitrogen, charged with 1 part of calcium metal, closed, chilled in a dry ice-methanol mixture, and the reactor is evacuated. The vessel is charged with 53 parts of liquid ammonia and pressured to 85 atmospheres with ethylene. During a reaction time of 9 hours at 245°–254° C. and 775–950 atmospheres, throughout which time the pressure is maintained in the indicated range by periodically repressuring with ethylene, the total observed pressure drop is 1175 atmospheres. The product is isolated by dissolving in benzene, filtering, steam distilling to remove the benzene, and drying. It amounts to 121.6 parts of a soft, waxy polyethylene which melts at 59° C. (bloc Maquenne) and has an intrinsic viscosity of 0.18 (0.125% solution in xylene at 85° C.).

*Example 4.*—A stainless steel-lined pressure reactor is flushed with nitrogen and charged with 5 parts of magnesium turnings. The vessel is closed, cooled in dry ice-methanol, evacuated, charged with 51 parts of liquid ammonia, and pressured to 100 atmospheres with ethylene. In a reaction time of 9 hours at 248°–254° C. and 810–950 atmospheres, throughout which time the pressure is maintained in the indicated range by periodically repressuring with ethylene, the total observed pressure drop is 1180 atmospheres. The product is isolated by the solvent process described in Example 3, followed by drying. There is obtained 110 parts of a soft, tacky ethylene polymer, M. P. 50° C. (bloc Maquenne), which has an intrinsic viscosity of 0.20 (0.125% solution in xylene at 85° C.).

*Example 5.*—A stainless steel-lined reaction vessel is flushed with nitrogen and charged with 5 parts of zinc dust. The vessel is then closed, cooled in dry-methanol, evacuated, charged with 51 parts of liquid ammonia, and pressured to 55 atmospheres with ethylene. A total pressure drop of 100 atmospheres is observed in a reaction time of 8 hours at 248°–250° C. and 855–925 atmospheres, throughout which time the pressure is maintained in the indicated way by periodically repressuring with ethylene. The product is isolated by dissolving in benzene, filtering, and evaporating the solvent. There is thus obtained 9.6 parts of a polyethylene having an intrinsic viscosity of 0.20 (0.125% solution in xylene at 85° C.), and melting at 68° C. (bloc Maquenne).

*Example 6.*—A stainless steel-lined reactor is flushed with nitrogen and charged with 5 parts of powdered cadmium. The vessel is closed, cooled in Dry Ice-methanol, evacuated, charged with 55 parts of liquid ammonia, and pressured to 80 atmospheres with ethylene. During a reaction time of 9 hours at 249°–251° C. and 890–950 atmospheres, throughout which time the pressure is maintained in the indicated range by periodically repressuring with ethylene, there is an observed pressure drop of 60 atmospheres. The product, isolated by dissolution in benzene, filtration and removal of solvent, amounts to 6.3 parts of polyethylene. It melts at 65° C. (bloc Maquenne), and has an intrinsic viscosity of 0.21 (0.125% solution in xylene at 85° C.).

The ethylene used in the practice of this invention is preferably as pure as is commercially available. In general, the process is operated under conditions such that the molecular oxygen content of the system based on ethylene is less than 200 parts per million with under 10 parts per million giving the best results.

Any of the metals of group II of the periodic table may be used as a catalyst. It is preferable that the metal be as pure as is commercially available, since some impurities, particularly copper, inhibit the reaction. The physical state of the catalyst is not critical, although a maximum of surface is preferred and desirable. The amount of catalyst for batch operation may be varied from about 0.005% to about 5%.

The polymerization is carried out in an inert anhydrous system. Suitable media for operation in this manner include hydrocarbons such as isooctane, cyclohexane, and benzene, ethers such as diethyl ether, ammonia and the like.

In some cases, the metals employed as catalysts are not recoverable as such, inasmuch as they are transformed into the corresponding amides in the presence of ammonia under the conditions of the reaction. The polymerization, however, can be effected with or without the addition of a reaction medium.

While the reaction has generally been described for the polymerization of ethylene, the catalysts of the invention may likewise be employed for preparing interpolymers or telomers. A number of interpolymers and telomers of ethylene are known which are prepared by contact of the ethylene either with a polymerizable organic compound or with a telogen in the presence of peroxy compound catalysts and other well known catalysts for the reaction. It has been found that the metals of group II of the periodic table are catalysts for these reactions also.

The invention may be operated over a wide range of temperatures, for example, from 150° to 300° C. It is not usually desirable to use the lowest temperature of this range because reaction is rather slow, so that the preferred range is from 200° C. to 275° C.

The preferred pressure range of this invention is from 700 to 1500 atmospheres, although any pressure from 500 to 10,000 atmospheres may be employed.

Any reaction vessel which is capable of withstanding the pressures employed at the desired temperatures in this reaction may be used in the practice of this invention. It is usually constructed of steel and may be lined with glass, porcelain, stainless steel, etc. It is not a desirable practice, however, to employ a silver-lined reactor when ammonia is used as a reaction medium, nor is copper considered a satisfactory material because of its inhibitory effects.

The novelty of the present invention lies principally in the use of group II metals as catalysts in the production of waxy ethylene polymers. Ethylene polymers themselves are by no means new, although those obtained by the present process possess some unusual properties. They are of fairly low molecular weight, soft, wax-like, and quite tacky, resembling polyisobutylene in the last respect. Thus, the product has utility as a tackifier in synthetic resin films or as an adhesive in laminated plastics, glass, paper, textiles, as a lubricating oil additive, etc. Its waxy nature suggests its use as an impregnant and water-proofing agent in paper and textile products, and its low molecular weight as a plasticizer, softening agent, or lubricant in a variety of applications.

We claim:

1. In a process for the preparation of solid polymers of ethylene the step which comprises subjecting ethylene in the presence of liquid anhydrous ammonia to a temperature between 150 and 300° C. and under a pressure between 500 and 10,000 atmospheres in the presence of a catalytic amount of a metal of group II of the periodic table.

2. In a process for the preparation of solid polymers of ethylene the step which comprises subjecting ethylene in the presence of liquid anhydrous ammonia to a temperature between 200 and 275° C. and under a pressure between 700 and 1500 atmospheres, in the presence of a catalytic amount of a metal of group II of the periodic table.

3. In a process for the preparation of solid polymers of ethylene, the step which comprises heating ethylene under anhydrous conditions and in the presence of ammonia at a temperature between 200° and 275° C. under a pressure between 500 and 10,000 atmospheres and in the presence of a catalytic amount of a metal of group II of the periodic table.

GERALD M. WHITMAN.
SAMUEL L. SCOTT.

REFERENCES CITED

The following references are of record in the file of this patent:

UNITED STATES PATENTS

| Number | Name | Date |
|---|---|---|
| 1,746,168 | Taylor | Feb. 4, 1930 |
| 1,952,116 | Bridgman | May 27, 1934 |
| 2,188,465 | Perrin | Jan. 20, 1940 |
| 2,200,429 | Perrin | May 14, 1940 |